(12) United States Patent
Chen

(10) Patent No.: US 9,228,839 B2
(45) Date of Patent: Jan. 5, 2016

(54) METHOD FOR GENERATING SPLIT SCREEN ACCORDING TO A TOUCH GESTURE

(71) Applicant: Chun-Ming Chen, Taipei (TW)

(72) Inventor: Chun-Ming Chen, Taipei (TW)

(73) Assignee: MITAC INTERNATIONAL CORP., Kuei-Shan Dist., Taoyuan (TW)

(*) Notice: Subject to any disclaimer, the term of this patent is extended or adjusted under 35 U.S.C. 154(b) by 78 days.

(21) Appl. No.: 13/761,167

(22) Filed: Feb. 7, 2013

(65) Prior Publication Data

US 2013/0218464 A1   Aug. 22, 2013

(30) Foreign Application Priority Data

Feb. 17, 2012   (TW) .............................. 101105254 A

(51) Int. Cl.
*G01C 21/00*   (2006.01)
*G01C 21/36*   (2006.01)
*G06F 3/0488*   (2013.01)

(52) U.S. Cl.
CPC ............ *G01C 21/00* (2013.01); *G01C 21/3664* (2013.01); *G06F 3/04883* (2013.01); *G06F 2203/04803* (2013.01); *G06F 2203/04806* (2013.01)

(58) Field of Classification Search
CPC .............. G06F 3/0484–3/04886; G01C 21/00; G01C 21/3664
See application file for complete search history.

(56) References Cited

U.S. PATENT DOCUMENTS

| | | | |
|---|---|---|---|
| 2009/0048773 A1* | 2/2009 | Jarventie et al. | 701/201 |
| 2010/0066698 A1* | 3/2010 | Seo | 345/173 |
| 2010/0194781 A1* | 8/2010 | Tossing et al. | 345/620 |
| 2011/0004822 A1* | 1/2011 | Nezu et al. | 715/702 |
| 2013/0076663 A1* | 3/2013 | Sirpal et al. | 345/173 |
| 2013/0246918 A1 | 9/2013 | Nezu | |

FOREIGN PATENT DOCUMENTS

| | | |
|---|---|---|
| CN | 1704886 A | 12/2005 |
| CN | 101655753 A | 2/2010 |
| TW | 201017461 | 5/2010 |
| TW | 2010017461 * | 5/2010 |

* cited by examiner

*Primary Examiner* — Mussa A Shaawat
*Assistant Examiner* — Kelly D Williams
(74) *Attorney, Agent, or Firm* — Winston Hsu; Scott Margo

(57) ABSTRACT

A method for generating split screen is disclosed. The method includes displaying a picture on a touch screen; touching the touch screen to circle a first area of the picture and to move along a first direction after circling the first area; and displaying and zooming out the picture in a first display block of the touch screen, and displaying and zooming in the first area in a second display block indicated by the first direction.

10 Claims, 7 Drawing Sheets

METHOD FOR GENERATING SPLIT SCREEN ACCORDING TO A TOUCH GESTURE

BACKGROUND OF THE INVENTION

1. Field of the Invention

The present invention relates to a method for generating split screen, and more particularly, to a method for generating split screen according to a touch gesture.

2. Description of the Prior Art

As related technology keeps improving, navigation techniques are widely used in many fields, such that many kinds of navigation devices become more popular, such as vehicle navigation devices or portable navigation devices (PND). Current portable navigation devices mostly are operated according to touch inputs. When a user is going to plan a trip, the user may move his finger to touch and select each destination of the trip on a navigation map displayed by a navigation device, and the navigation device then plans a route according to each destination of the trip selected by the user.

However, when the user selects each destination of the trip on the navigation map displayed by the navigation device of the prior art, the user must operate the navigation device to perform operations of zoom-in, zoom-out and scroll up/down/left/right to the navigation map very often for selecting and storing each of the destinations one by one. The above method for selecting the destinations is inconvenient to the user, and is also time consuming for planning a trip.

SUMMARY OF THE INVENTION

The present invention provides a method for generating split screen. The method comprises displaying a picture on a touch screen; touching the touch screen to circle a first area of the picture and to move along a first direction after circling the first area; and displaying and zooming out the picture in a first display block of the touch screen, and displaying and zooming in the first area in a second display block indicated by the first direction.

In contrast to the prior art, the present invention provides a method for generating split screen according to a touch gesture. The method of the present invention can simultaneously display a zoomed-out original picture and a zoomed-in area of the original picture in the split screen according to the circling area and moving direction of the touch gesture, in order to assist the user to edit some area of the original picture. Besides, when the method of the present invention is applied to the navigation device for route planning, the method of the present invention can save time for planning a trip.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
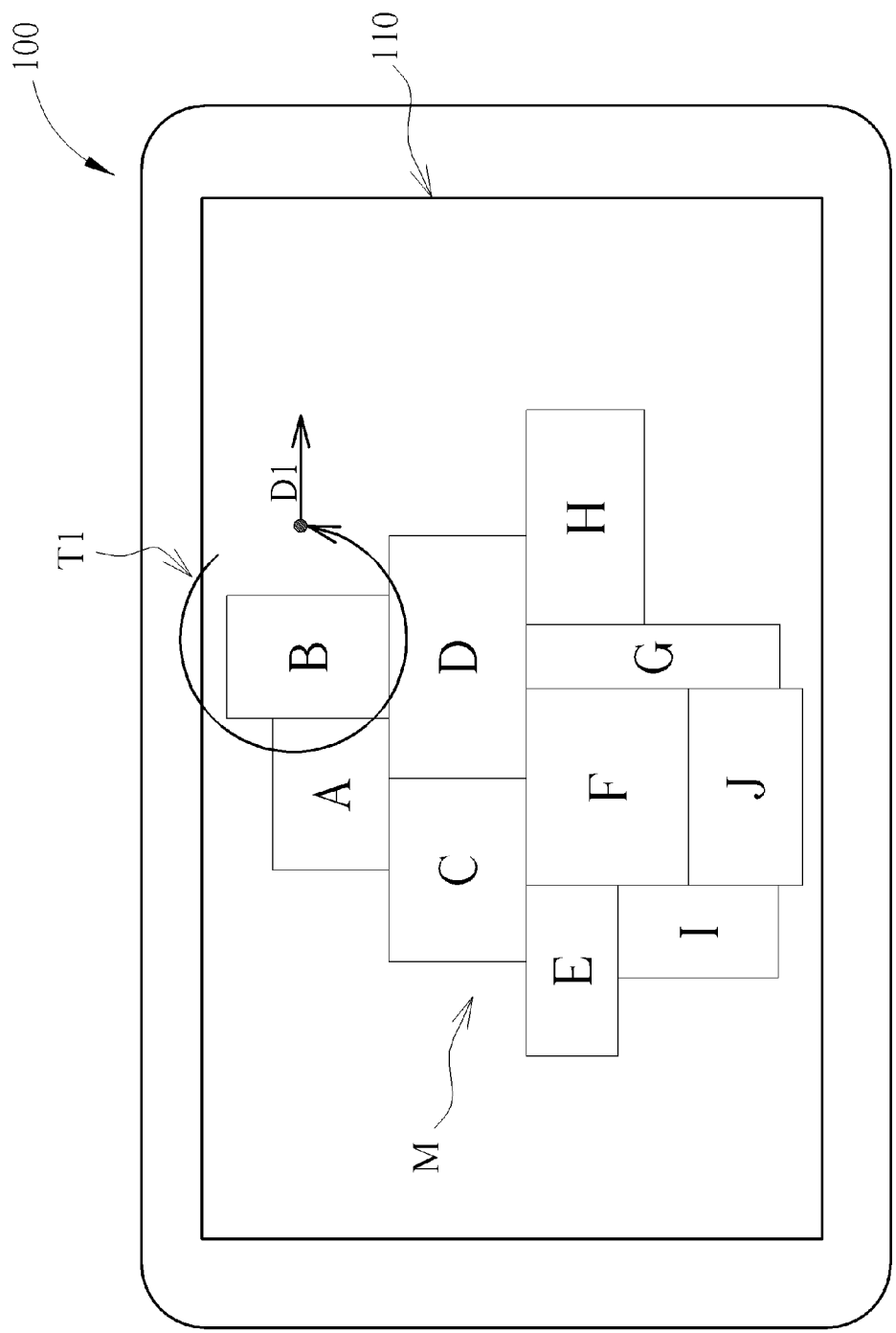
FIG. 1 is a diagram illustrating a navigation device displaying a navigation map on a touch screen.
Figure 2:
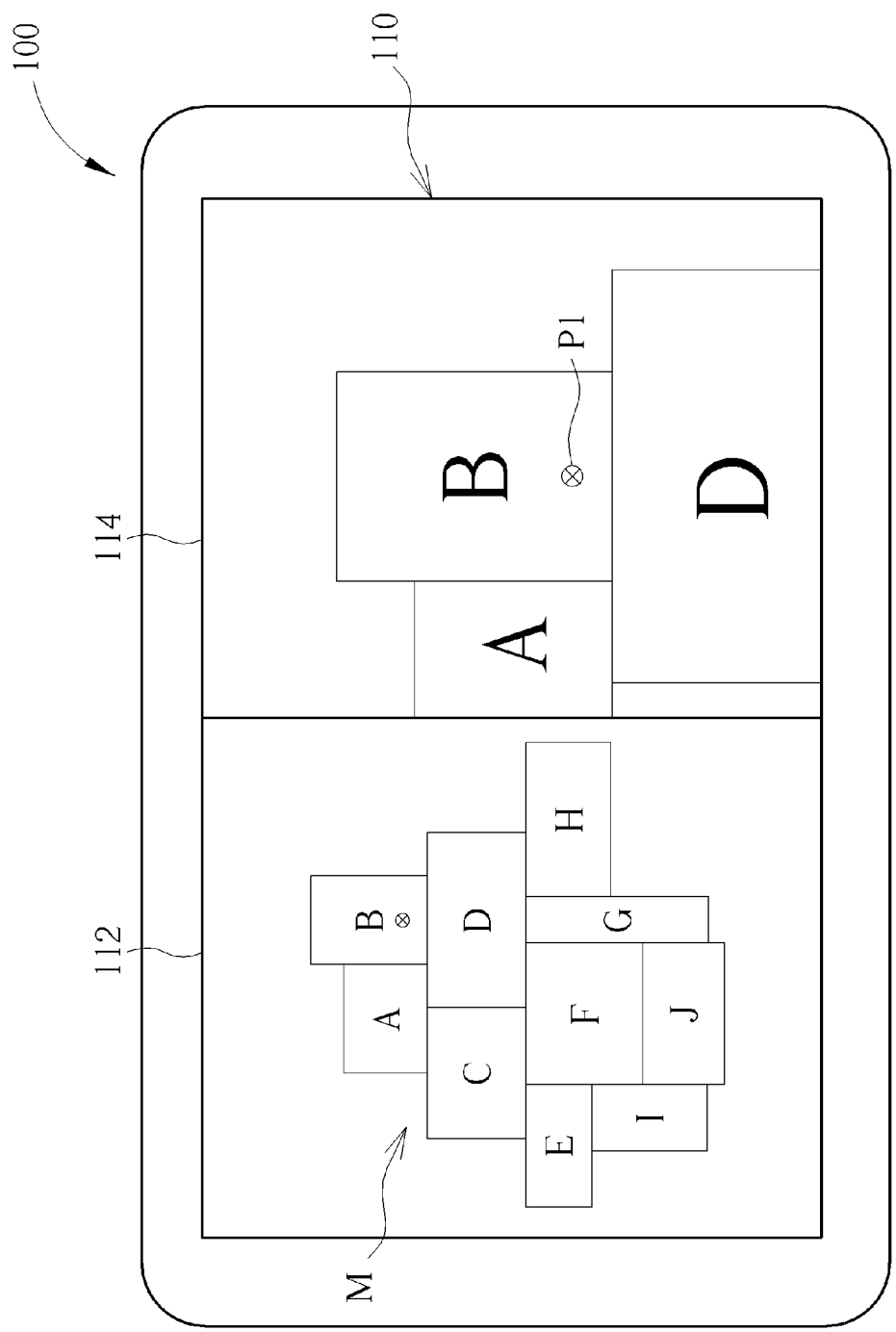
FIG. 2 is a diagram illustrating a method of a first embodiment of the present invention for generating split screen according to a touch gesture.

Please refer to FIG. 1 and FIG. 2. FIG. 1 is a diagram illustrating a navigation device displaying a navigation map on a touch screen. FIG. 2 is a diagram illustrating a method of a first embodiment of the present invention for generating split screen according to a touch gesture. As shown in FIG. 1, a touch screen 110 of a navigation device 100 displays a navigation map M in full screen at the beginning. The navigation map M comprises a plurality of areas A-J. When a user move his finger to generate a touch gesture T1 for circling the area B of the navigation map M on the touch screen 110 and moving along a first direction D1 after circling the area B, the navigation device 100, as shown in FIG. 2, displays and zooms out the navigation map M in a first display block 112 of the touch screen 110, and displays and zooms in the area B in a second display block 114 indicated by the first direction D1 according to the touch gesture T1 of the user. Therefore, the user can further edit the area B in the second display block 114, such as touching and selecting a first destination P1 of a trip in the area B. The navigation device 100 then updates the navigation map M displayed in the first display block 112 according to an editing result of the area B in the second display block 114. For example, the navigation device 100 marks the first direction P1 on the navigation map M displayed in the first display block 112. According to the above arrangement, when the navigation device 100 respectively displays the zoomed-out navigation map M and the zoomed-in area B in the first display block 112 and the second display block 114, the user can easily touch and select the first destination P1 in the area B by referring to images at both sides of the touch screen 110. During the process of touching and selecting the first destination P1 in the area B, the user still can operate the navigation device 100 to perform operations of zoom-in, zoom-out and scroll up/down/left/right to the area B in the second display block 114 for facilitating selection of the first destination P1.

Figure 3:
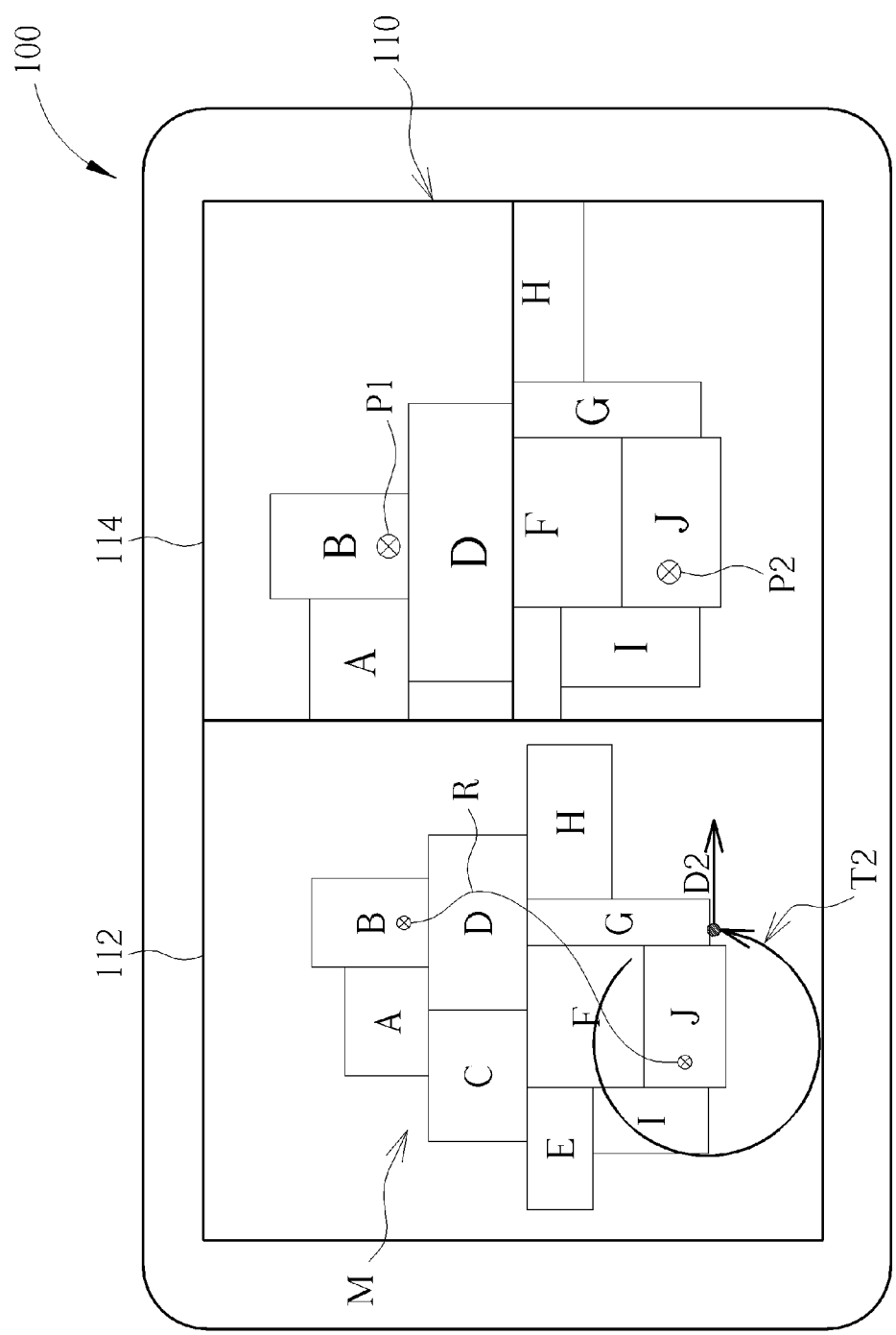
FIG. 3 is a diagram illustrating a method of a second embodiment of the present invention for generating split screen according to a touch gesture.

Please refer to FIG. 3. FIG. 3 is a diagram illustrating a method of a second embodiment of the present invention for generating split screen according to a touch gesture. As shown in FIG. 3, after circling the area B to generate the split screen, the user can circling other areas of the navigation map M to generate other split screen. For example, the user can move his finger to generate a touch gesture T2 for circling the area J of the navigation map M in the first display block 112 on the touch screen 110 and moving along a second direction D2 (the second direction D2 is identical to the first direction D1 in this embodiment) after circling the area J, and the navigation device 100 then displays and zooms in the area J in the second display block 114 indicated by the second direction D2 according to the touch gesture T2 of the user. The zoomed-in area B and area J can be evenly displayed in the second display block 114 for allowing the user to edit the area B and area J at the same time. For example, the user can further touches and selects a second destination P2 of the trip in the area J displayed in the second display block 114. The navigation device 100 then updates the navigation map M displayed in the first display block 112 according to an editing result of the area J in the second display block 114, such as marking the second direction P2 on the navigation map M displayed in the first display block 112. The navigation device 100 can further plan a navigation route R according to the first destination P1 and the second destination P2. Similarly, during the process of touching and selecting the second destination P2 in the area J, the user still can operate the navigation device 100 to perform operations of zoom-in, zoom-out and scroll up/down/left/right to the area J in the second display block 114 for facilitating selection of the second destination P2.

Figure 4:
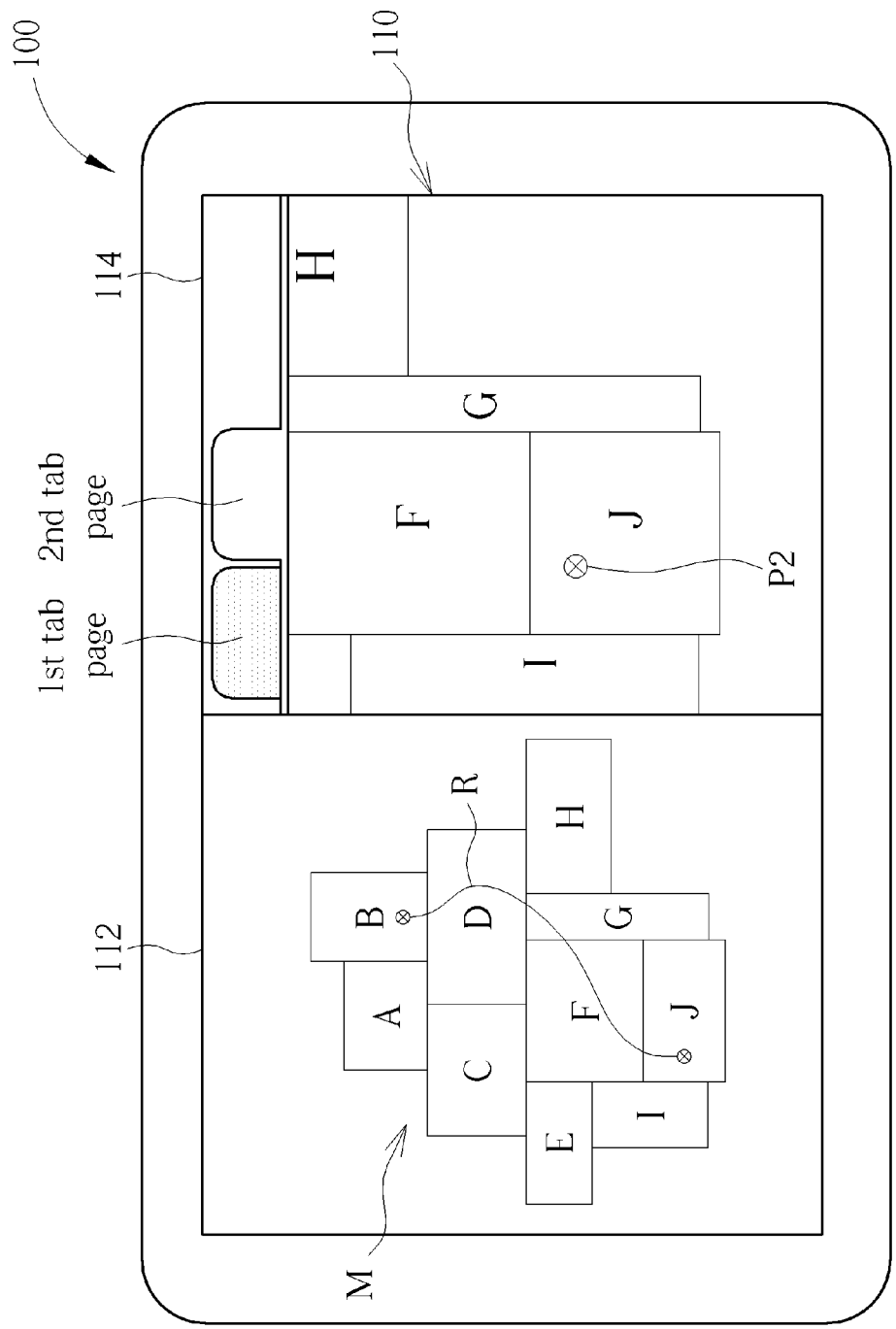
FIG. 4 is a diagram illustrating a method of a third embodiment of the present invention for generating split screen according to a touch gesture.

Please refer to FIG. 4. FIG. 4 is a diagram illustrating a method of a third embodiment of the present invention for generating split screen according to a touch gesture. As shown in FIG. 4, in addition to evenly display the zoomed-in area B and area J in the second display block 114, the method of the present invention can also respectively display the zoomed-in area B and area J as tab pages in the second display block, such as displaying area B in a first tab page and displaying area J in a second tab page. Therefore, when the touch screen 110 of the navigation device 100 is small, the area B and area J still can be displayed in the second display block 114 clearly.

Figure 5:
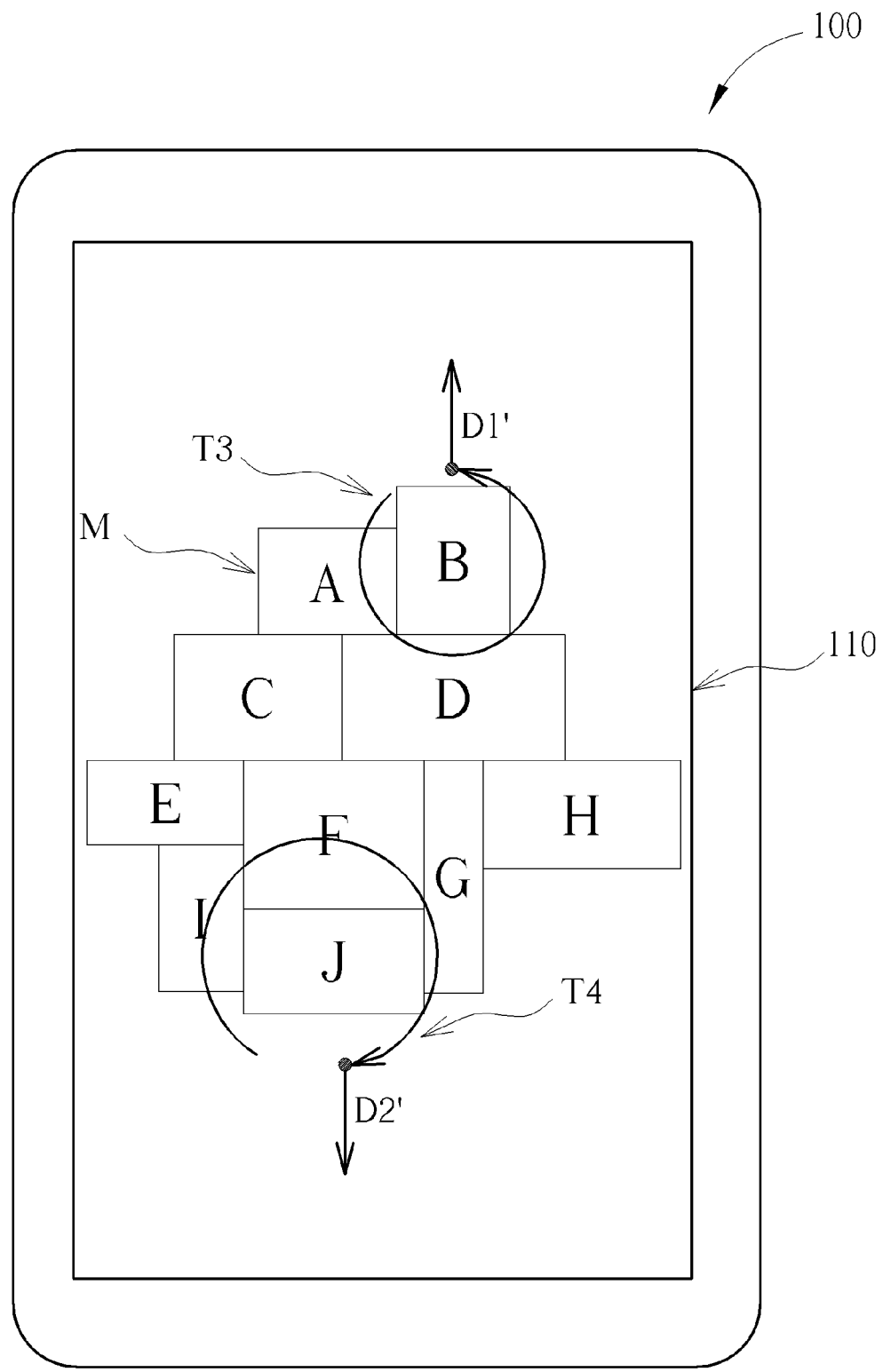
FIG. 5 is a diagram illustrating the method of the present invention circling and selecting areas of the navigation map by touch gestures.
Figure 6:
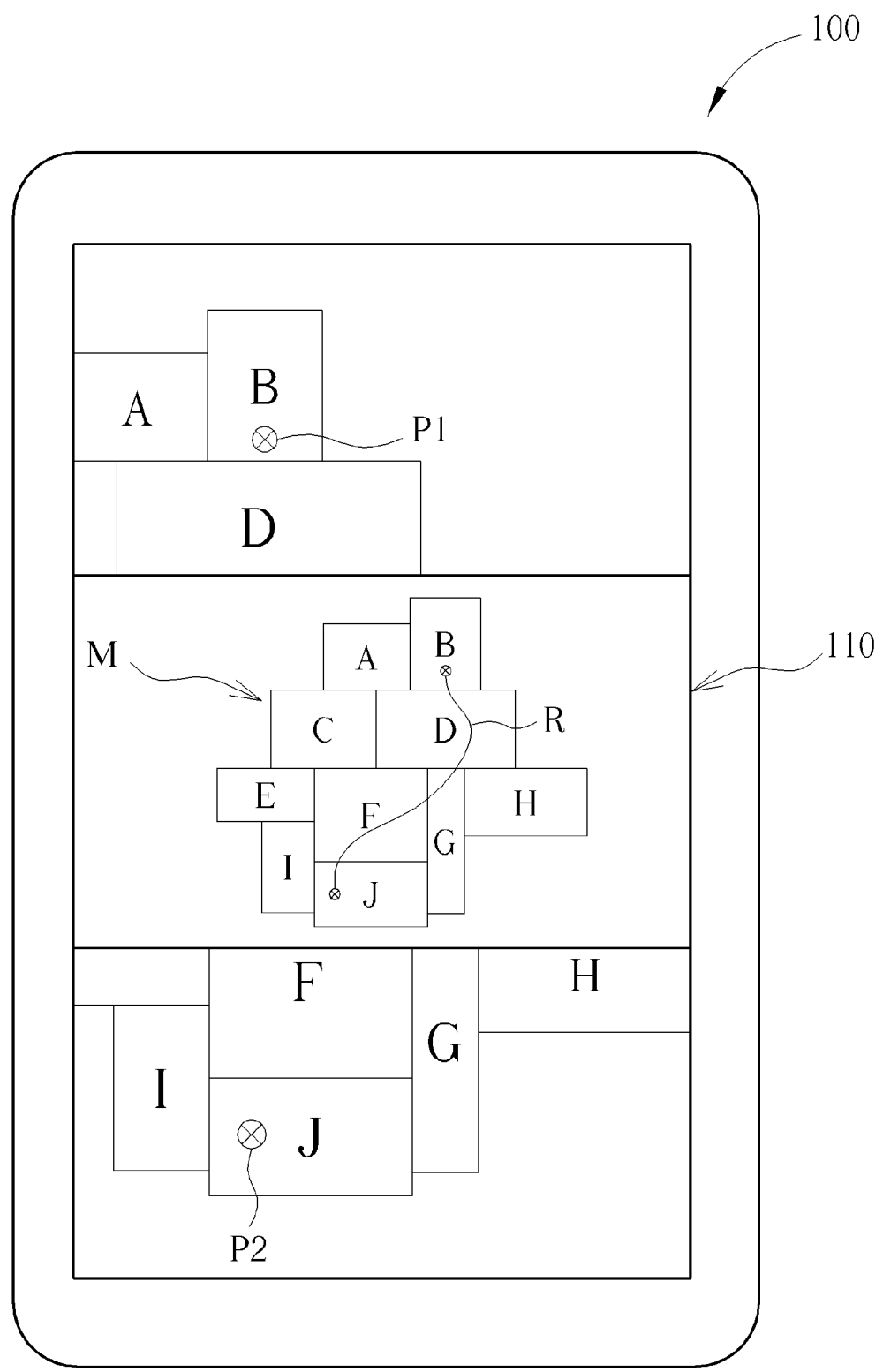
FIG. 6 is a diagram illustrating a method of a fourth embodiment of the present invention for generating split screen according to a touch gesture.

Please refer to FIG. 5 and FIG. 6 together. FIG. 5 is a diagram illustrating the method of the present invention circling and selecting areas of the navigation map by touch gestures. FIG. 6 is a diagram illustrating a method of a fourth embodiment of the present invention for generating split screen according to a touch gesture. As shown in the figures, the method of the present invention can also display different areas at different display blocks. For example, the navigation device 100 can display and zoom in the area B in an upper display block of the touch screen 110 indicated by a first direction D1' according to a touch gesture T3 of the user, and display and zoom in the area J in a lower display block of the touch screen 110 indicated by a second direction D2' (the second direction D2' is different from the first direction D1' in this embodiment) according to a touch gesture T4 of the user. The above arrangement can clearly illustrate relative positional relationship between the area B and the area J.

In the above embodiments, the user moves his finger to generate the touch gesture for circling the area of the navigation map M, wherein the touch gesture for circling can be a closed curve or a non-closed curve. In addition, there are many methods to determine which area is circled by the touch gesture. For example, although the navigation M is a complete and continuous image to the user, but to the navigation device 100, the navigation map M is constituted of a plurality of maps of areas A-J. When the navigation device 100 determines which area is circled by the touch gesture, the navigation device 100 can determine an area is circled by the touch gesture according to where an area center point of a region circled by the touch gesture is located on, or, the navigation device 100 can determine an area is circled by the touch gesture according to where a geometric center point of a plurality sampling points of the touch gesture is located on. The above methods for determining the area circled by the touch gesture are for examples. The method for determining the area circled by the touch gesture of the present invention should include but not be limited to the above methods.

In addition, the method of the present invention is not limited to apply to the navigation device for route planning. The method for generating split screen according to a touch gesture of the present invention can be also applied to other application software, such as image editing software, for assisting the user to edit some area of an image.

Figure 7:
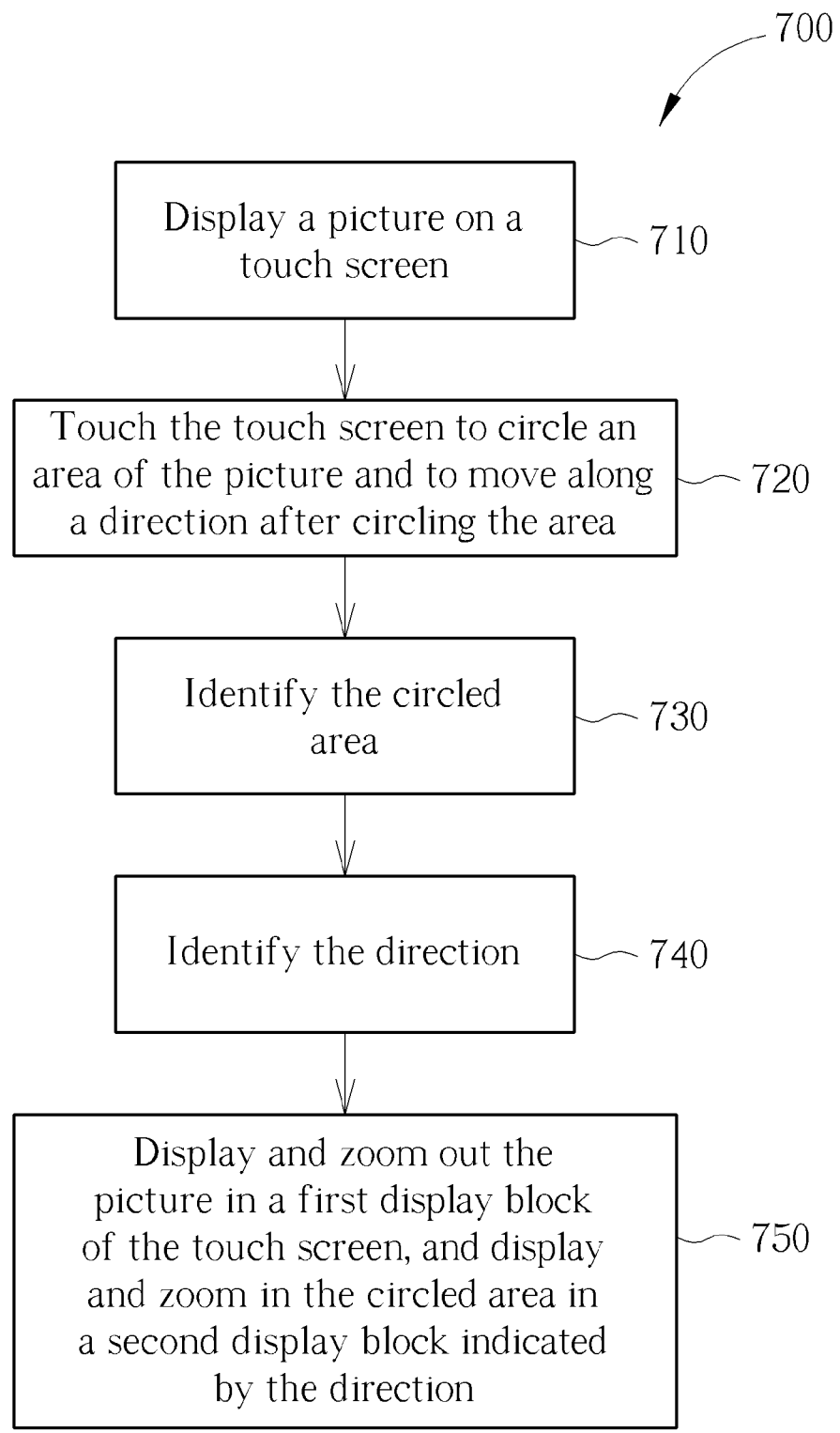
FIG. 7 is a flowchart showing the method for generating split screen according to a touch gesture of the present invention.

Please refer to FIG. 7. FIG. 7 is a flowchart 700 showing the method for generating split screen according to a touch gesture of the present invention. The flowchart of the method for generating split screen according to a touch gesture of the present invention comprises the following steps:

Step 710: Display a picture on a touch screen;
Step 720: Touch the touch screen to circle an area of the picture and to move along a direction after circling the area;
Step 730: Identify the circled area;
Step 740: Identify the direction; and
Step 750: Display and zoom out the picture in a first display block of the touch screen, and display and zoom in the circled area in a second display block indicated by the direction.

In contrast to the prior art, the present invention provides a method for generating split screen according to a touch gesture. The method of the present invention can simultaneously display a zoomed-out original picture and a zoomed-in area of the original picture in the split screen according to the circling area and moving direction of the touch gesture, in order to assist the user to edit some area of the original picture. Besides, when the method of the present invention is applied to the navigation device for route planning, the method of the present invention can save time for planning a trip.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating split screen according to a touch gesture, comprising:
   displaying a picture on a touch screen;
   touching the touch screen to circle a first area of the picture and to move substantially straight along a first direction after circling the first area for completing a touch gesture; and
   splitting the touch screen after completing the touch gesture for displaying and zooming out the picture in a first display block of the touch screen and for displaying and zooming in the first area circled by the touch gesture in a second display block being located on a side of the touch screen corresponding to the first direction.

2. The method of claim 1 further comprising:
   touching the touch screen to circle a second area of the picture on the first display block and to move along a second direction after circling the second area; and
   displaying and zooming in the second area in a third display block indicated by the second direction.

3. The method of claim 1 further comprising:
   touching the touch screen to circle a second area of the picture in the first display block and to move along the first direction after circling the second area; and
   displaying and zooming in the second area in the second display block indicated by the first direction.

4. The method of claim 3, wherein the zoomed-in first area and the zoomed-in second area are evenly displayed in the second display block.

5. The method of claim 3, wherein the zoomed-in first area and the zoomed-in second area are respectively displayed as tab pages in the second display block.

6. The method of claim 1 further comprising editing the first area displayed in the second display block.

7. The method of claim 6 further comprising updating the picture displayed in the first display block according to an editing result of the first area displayed in the second display block.

8. The method of claim 7, wherein the picture is a navigation map.

9. The method of claim 8 further comprising planning a navigation route according to the editing result of the first area displayed in the second display block.

10. The method of claim 1, wherein the picture is a navigation map.

* * * * *